United States Patent
Kaneko

(10) Patent No.: US 7,682,407 B2
(45) Date of Patent: Mar. 23, 2010

(54) TEXTILE DYEING METHOD, DYED TEXTILE, AND DYE

(76) Inventor: Takashi Kaneko, c/o Kanemasu Corporation, 39-3, Nishi 5-chome, Hanyuu-shi, Saitama 348-0054 (JP)

( * ) Notice: Subject to any disclaimer, the term of this patent is extended or adjusted under 35 U.S.C. 154(b) by 844 days.

(21) Appl. No.: 10/581,082

(22) PCT Filed: Nov. 19, 2004

(86) PCT No.: PCT/JP2004/017288

§ 371 (c)(1), (2), (4) Date: May 31, 2006

(87) PCT Pub. No.: WO2005/054568

PCT Pub. Date: Jun. 16, 2005

(65) Prior Publication Data

US 2007/0101514 A1 May 10, 2007

(30) Foreign Application Priority Data

Dec. 1, 2003 (JP) ............................. 2003-401188

(51) Int. Cl.
*C09B 61/00* (2006.01)
(52) U.S. Cl. .................................... 8/646; 8/636; 8/438
(58) Field of Classification Search ...................... 8/636, 8/646
See application file for complete search history.

(56) References Cited

U.S. PATENT DOCUMENTS 5,221,289 A * 6/1993 Miyamatsu et al. ............. 8/646
6,749,647 B2   6/2004 Kaneko
2002/0166183 A1* 11/2002 Kaneko ......................... 8/550

FOREIGN PATENT DOCUMENTS

| EP | 754734 A1 * | 1/1997 |
| GB | 107605 | 7/1917 |
| JP | 62-503039 | 12/1987 |
| JP | 63120762 | 5/1988 |
| JP | 08-176965 | 7/1996 |
| JP | 11-124778 | 5/1999 |
| JP | 2000-095962 | 4/2000 |
| JP | 2001-192580 | 7/2001 |
| JP | 2002-339265 | 11/2002 |
| JP | 2003-012955 | 1/2003 |
| JP | 2003-129389 | 5/2003 |
| JP | 2004-168742 | 6/2004 |
| WO | 86/07080 | 4/1986 |

\* cited by examiner

*Primary Examiner*—Harold Y Pyon
*Assistant Examiner*—Katie Hammer
(74) *Attorney, Agent, or Firm*—Mattingly & Malur, P.C.

(57) ABSTRACT

A textile dyeing method includes a drying step 100 of drying a natural material within a set temperature range in which a coloring component of the natural material is hardly altered, thereby bringing the natural material into an absolutely dried state or a nearby state, a pulverizing step 200 of pulverizing the dried natural material obtained in the drying step 100 into fine powder of not larger than particle size being passable through at least 80 mesh in terms of sieve standards while controlling temperature of the natural material not to exceed the set temperature range, and a dyeing step 300 of mixing and dispersing the fine powdery natural material into a liquid, and immersing a textile in the liquid containing the fine powdery natural material in suspended condition, thus causing the fine powdery natural material suspended in the liquid to be physically attached to the textile.

7 Claims, 2 Drawing Sheets

TEXTILE DYEING METHOD, DYED TEXTILE, AND DYE

TECHNICAL FIELD

The present invention relates to a textile dyeing method using natural materials, a dyed textile, a dye.

BACKGROUND ART

Hitherto, as a typical example of dyeing methods using coloring matters extracted from natural plants to dye textiles, such as threads and cloths, there is known dyeing with vegetable dyes, in which a decoction extracted by decocting roots, stems, barks, leaves, flowers, fruits/seeds, etc. of various natural plants is employed as a dye bath. With the dyeing with vegetable dyes, however, because an adsorption rate of the coloring matters is low, a dyeing step has to be repeated or performed by a method using a mordant and a catalyst in order to reproduce the desired color. Further, a very long time is required for the dyeing step, and the fastness of color against washing is also not so high.

In view of such a situation, there is proposed a technique for pulverizing a natural material, from which a coloring matter is to be extracted, into powder of 20 to 30 microns, dispersing the powder in a prepared solvent, filtering the disperse solution to obtain, as a dye bath, a filtrate from which the powder has been removed, and dyeing a cellulose-base textile material in the dye bath (see, e.g., Patent Document 1). Thus, the proposed technique is intended to increase extraction efficiency of the coloring matter from the natural material by pulverizing the natural material into the powder of 20 to 30 microns.

Patent Document 1: JP, A 11-124778

DISCLOSURE OF THE INVENTION

Problems to be Solved by the Invention

However, the above-mentioned prior art has a limitation in spite of increasing the extraction efficiency of the coloring matter. In other words, the method of dying a textile by extracting the coloring matter from the natural material has a difficulty in dyeing a textile in color that is inherently specific to the natural material with high fastness.

An object of the present invention is to provide a textile dyeing method capable of dyeing a textile in the same color as that of a natural material with high fastness, a dyed textile, a dye.

To achieve the above object, the present invention provides a textile dyeing method comprising a drying step of drying a natural material within a set temperature range in which a coloring component of the natural material is hardly altered, thereby bringing the natural material into an absolutely dried state or a state close to the absolutely dried state; a pulverizing step of pulverizing the dried natural material obtained in the drying step into fine powder of not larger than particle size being passable through at least 80 mesh in terms of sieve standards while controlling temperature of the natural material not to exceed the set temperature range; and a dyeing step of mixing and dispersing the fine powdery natural material obtained in the pulverizing step into a liquid, and immersing a textile in the liquid containing the fine powdery natural material in suspended condition, thus causing the fine powdery natural material suspended in the liquid to be physically attached to the textile, whereby the textile is dyed in the same color as that of the natural material.

Figure 1:
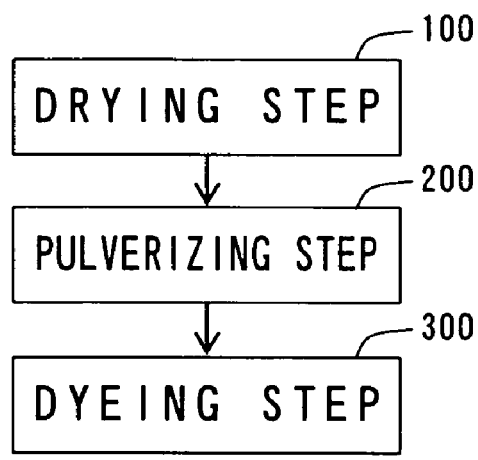
FIG. 1 is a flowchart showing successive steps of one embodiment of a textile dyeing method according to the present invention.

REFERENCE NUMERALS 2 natural material
3 drying chamber
4 heating means
5 ventilating means
6 core
7 reflecting sheet
20 coloring component
100 drying step
200 pulverizing step
300 dyeing step

BEST MODE FOR CARRYING OUT THE INVENTION

One embodiment of a textile dyeing method according to the present invention will be described below with reference to the drawings.

The present invention resides in a novel dyeing method which has hitherto been unknown and is featured in that fine powder of a natural material obtained by drying and pulverizing the natural material, i.e., the natural material itself in the form of fine powder, is physically attached as a dye onto a textile, to thereby reproduce the color of the natural material as it is. More specifically, a dye used in the dyeing method according to the present invention is a solid dye in the form of fine powder, which is obtained by dehyrating and pulverizing the natural material and which has a coloring component of the natural material as it is. In the dyeing method according to the present invention, any kinds of natural materials can be employed as raw stuffs so long as they can be pulverized into fine powder of such particle size as enabling the powder to be attached to a textile, including not only the plant materials (such as roots, stems, barks, leaves, flowers and seeds of natural plants) used in the known dyeing with vegetable dyes, but also other plant materials which cannot be used as raw stuffs in the known dyeing with vegetable dyes, e.g., mushrooms, marine algae, and edible wild plants, any other kinds of materials existing in the natural world which can be collected or produced, e.g., various kinds of organisms, egg shells, bones, sand, earth, minerals and deposits of hot-spring water, processed stuffs of those materials existing in the natural world, as well as byproducts, wastes, garbage, etc. which are generated in the production processes of target materials.

The term "natural material" used in this description means all kinds of substances originating from the nature except for petroleum-based materials, and processed and mixed stuffs thereof. However, because the present invention is featured in pulverizing raw stuffs into fine powder and dyeing a textile by physically attaching the fine powder to the textile, the raw stuffs are not always limited to the natural materials, and may be petroleum-based oil components and petroleum-based artificial materials (e.g., plastics) produced from the former so long as they can be pulverized into fine powder of particle size capable of being attached to the textile.

Also, targets to be dyed by the dyeing method of the present invention include all kinds of textiles made of fibers and having rugged surfaces, which are represented, for example, by medical and sport goods such as bandages, masks and supporters, clothing such as neckties, socks, hats, shirts, sweaters and trousers, cloths such as wall cloths, carpets and various cover goods, and other cloth goods.

FIG. 1 is a flowchart showing successive steps of one embodiment of the textile dyeing method according to the present invention.

As shown in FIG. 1, the textile dyeing method according to the present invention comprises a drying step 100 for drying a natural material, a pulverizing step 200 for pulverizing the dried natural material obtained in the drying step 100 into fine powder, and a dyeing step 300 for physically attaching the fine powder of the natural material obtained in the pulverizing step 200 to a textile.

In the drying step 100, the natural material is dried within the set temperature range into an absolutely dried state (i.e., state containing moisture of less than 4%) or a state close to it. The term "set temperature range" used here differs depending on the kind of natural material used, but it means temperatures at which the color of the natural material, i.e., the coloring component contained in the natural material, is hardly altered. Except for a particular coloring component such as tannin, most of general coloring components react with sugars, etc. contained in plants at temperatures of about 60-70° C. and change into different components. Therefore, when natural materials having coloring components altered at temperatures of about 60-70° C. are employed, those natural materials are dried within the temperature range of, e.g., 60° or below.

Figure 2:
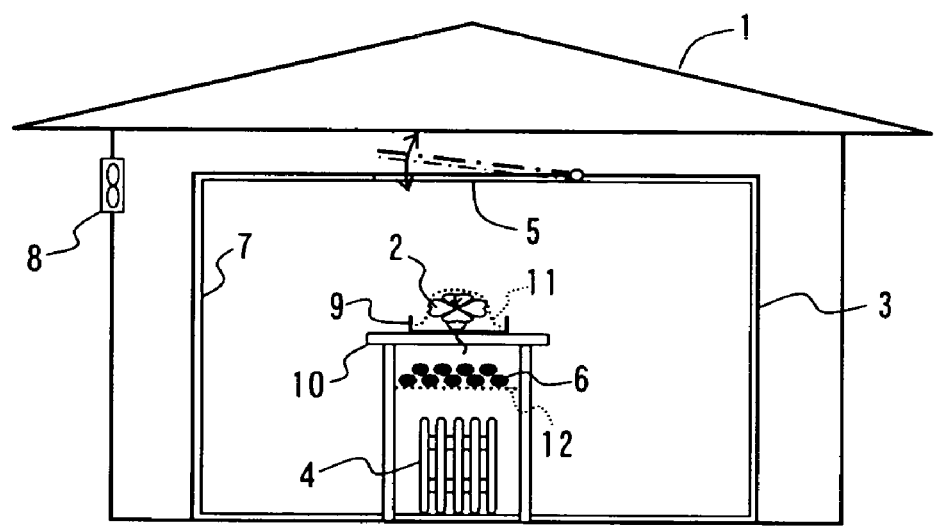
FIG. 2 is a conceptual view showing one construction of a drying apparatus according to the present invention.

FIG. 2 is a conceptual view showing one construction of a drying apparatus used in the drying step 100 according to the textile dyeing method of this embodiment.

In FIG. 2, the drying apparatus is employed in producing a dye according to the present invention and comprises a drying chamber 3 provided in a building 1 and drying a natural material 2, heating means 4 installed in the drying chamber 3 and radiating a far infrared ray to raise the temperature in the drying chamber 3, ventilating means 5 installed in the drying chamber 3 and adjusting the temperature and humidity in the drying chamber 3, a core 6 installed in the drying chamber 3 and radiantly emanating activation waves that contain a far infrared ray, and a reflecting sheet 7 stuck to an inner wall surface of the drying chamber 3 and reflecting the far infrared ray radiated from the heating means 4 or the core 6.

The building 1 is an existing building, e.g., a house or an office, in the illustrated example, but it may be a pre-fabricated house or cabin constructed for the dedicated purpose. Preferably, the building 1 is provided with a ventilating fan 8 or other suitable ventilating unit. The building 1 is employed to avoid the drying chamber 3 from being directly affected by the temperature and humidity of open air. Therefore, if the influence of the temperature and humidity of open air upon the drying chamber 3 is within an allowable range, the building 1 is not necessarily required.

The drying chamber 3 is not limited to particular one in its form and is just required to have a space of appropriate volume. The ventilating means 5 may be, e.g., a fan. In the illustrated example, however, the ventilating means 5 is provided as an opening/closing flap disposed in the ceiling of the drying chamber 3 for the purpose of ensuring air-tightness of the drying chamber 3 when heated. Stated another way, the temperature and humidity in the drying chamber 3 are monitored by using a thermometer and a hygrometer, for example, and the ventilating means 5 is opened and closed, as required, so that the desired temperature and humidity environments depending on the natural material 2 are maintained in the drying chamber 3.

The natural material 2 is put on a saucer 9 placed on a stand 10 which is arranged in the drying chamber 3 so as to position substantially right under the ventilating means 5. Though not shown in detail, a top plate of the stand 10 and a bottom portion of the saucer 9 are each in the form of a mesh or in the form having at least one hole such that the natural material is easily subjected to the action of heat from the heating means 4 disposed at a lower position and that when, for example, a flower with a stem is used as the natural material 2 as shown, the stem is projected downward of the top plate of the stand 10 through the saucer 9 and the top plate of the stand 10.

When a flower with a stem is used as the natural material 2 as mentioned above, petals are relatively easily dried, but the stem is harder to dry. In this embodiment, therefore, salt 11 is put on the saucer 9 to fixedly support the natural material 2 in a state of the stem projecting downward as shown. Further, the salt 11 is heaped to such an extent as covering almost the whole of the natural material 2, to thereby mitigate heating of the petals. As a result, different parts of the natural material 2 can be dried at an even rate in the drying progress, and the relatively easily dried part can be prevented from being subjected to excessive heating. Preferably, the salt 11 is finely pulverized in advance from a point of easily removing the salt by spraying, for example, after the drying step.

The heating means 4 can be constituted by the known type of heater capable of radiating a far infrared ray, and it is preferably installed in a lower portion of the stand 10, i.e., substantially right below the natural material 2. Further, a mesh-like member 12 is disposed at a position under the top plate of the stand 10, but above the heating means 4, i.e., substantially right below the natural material 2, and the core 6 is placed on the mesh-like member 12 as required.

The core 6 has a property of radiantly emanating a far infrared ray and is given by, e.g., natural stones such as black lead fluorite ("black silica") and the so-called "iouseki". The far infrared rays radiantly emanated from the core 6 and the heating means 4 are reflected by the reflecting sheet 7 (e.g., an aluminum foil) stuck to the inner wall surface of the drying chamber 3 and are irradiated to the natural material 2 from various directions. The far infrared rays are electromagnetic waves within the wavelength range of 4-14 microns. Those far infrared rays are usually called nurturing light and have characteristics resonating with cell molecules of animals and plants and activating cells themselves. By drying the natural material 2 at low temperatures while irradiating the far infrared rays, the natural material 2 can be dried into the absolutely dried state or the state close to it, while the color of the natural material 2 remains the same, without altering the coloring component of the natural material 2.

Returning to FIG. 1, in the above-described pulverizing step 200, the dried natural material obtained in the drying step 100 is pulverized into fine powder of not larger than the particle size being passable through at least 80 mesh in terms of sieve standards under such control that, during the pulverization, the temperature does not exceed the above-mentioned range set depending on the natural material used, in which the coloring component contained in the natural material is essentially avoided from altering. The obtained fine powder of the natural material is passed through a filter having the desired mesh size (at least 80 mesh or smaller in terms of sieve standards), to thereby produce fine powder with even particle size.

The particle size of the dried natural material after the pulverizing step is preferably as small as possible to such an extent that the coloring component contained in the natural material is not broken, i.e., so long as the color and other characteristics of the natural material are not lost. On the other hand, if the fine powder has particle size not being passable through 80 mesh, the fine powder cannot be attached to a textile. For that reason, the natural material is pulverized to the particle size being passable through at least 80 mesh. There are differences in limitation of the achievable particle size depending on the natural materials to be pulverized. However, the inventor has found that, by pulverizing the natural material into fine powder of such particle size as being passable through 250 mesh, it is possible to obtain the fine powder of the natural material still having the same color and other characteristics as those before the pulverization.

Generally, because the hardness of the natural material is greatly increased in the absolutely dried state or the state close to it, the dried natural material is in nature difficult to be pulverized into the fine powder of not larger than the particle size being passable through 80 mesh within the temperature range in which the coloring component is not altered. In fact, there is not known in the field of dyeing a precedent example of pulverizing natural materials into fine powder of not larger than the particle size being passable through 80 mesh in terms of sieve standards. The method of pulverizing the dried natural material into the fine powder is not limited to particular one, but dry pulverization is preferable. The pulverizing method can be practiced, for example, by using any of general pulverizers such as a high-speed pulverizer, a ball mill, a stirring mill and a jet pulverizer, or a grinder. However, when such a conventional pulverizing method is used, it is possible to pulverize the dried natural material into the fine powder of not larger than the particle size being passable through 80 mesh, but there is a possibility that a large amount of heat is generated with the pulverization and the natural material is subjected to the excessive amount of heat, whereby the temperature of the natural material is overly increased and the coloring component contained in the natural material is altered.

As a result of conducting studies for many years, the inventor has found an apparatus suitable for pulverizing the dried natural material into the fine powder of not larger than the particle size being passable through 80 mesh within the temperature range in which the coloring component is not altered. That apparatus comprises an upper mill and a lower mill each of which is made of a stone or a ceramic. The dried natural material supplied between the lower mill and the upper mill is ground down based on the principle of a stone mill by rotating the lower mill and the upper mill relative to each other while the lower mill and the upper mill are preferably moved up and down. The upper mill and the lower mill may be constructed such that one of the two mills is rotated, or both the mills are rotated in opposed directions. Preferably, cooling means is provided to cool at least one of the upper mill and the lower mill, for example, by supplying cooling water to the interior of at least one of the upper mill and the lower mill. It has been proved that, by using that type of pulverizer and repeating the pulverizing step as required, the dried natural material can be reliably pulverized into the fine powder of not larger than the particle size being passable through 80 mesh in terms of sieve standards without exceeding a limit of the temperature above which the coloring component is altered. A commercially available example of that type of pulverizer based on the principle of a stone mill is "Micropowder KGW-501" by Nishi Ironworks Co., Ltd. By using the "Micropowder KGW-501", the inventor has confirmed that the natural material in the form of fine powder of not larger than the particle size being passable through 80 mesh (fine powder having particle size of about 0.5 to 5 microns depending on the kind of natural material) can be obtained while the temperature during the pulverization is held at about 40 to 50° C.

Figure 3:
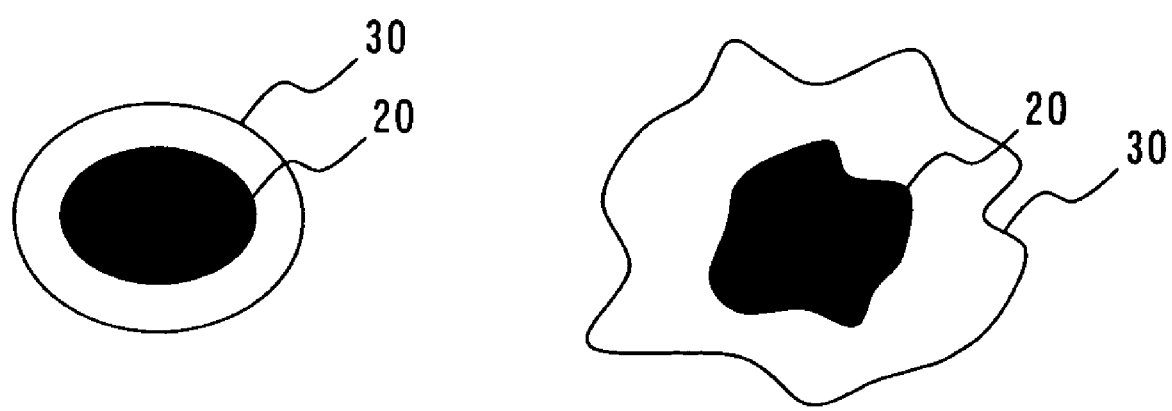
FIG. 3 is an enlarged view illustrating a dye according to the present invention.

As shown in an enlarged illustration of FIG. 3, the fine powdery natural material obtained in the pulverizing step 200 is in a state having a substantially spherical or flattened shape, in which cells of the natural material are not broken and, looking at a microscopic scale, a coloring component 20 remaining the same as that prior to the pulverization is sealed off, as it is, inside a coating layer 30 made of, e.g., cellulose, resinin, resin, or oil (which has different compositions depending on natural materials). Since the fine powdery natural material is covered with the coating layer 30 as shown, contact of the coloring component 20 with air is so rare that the coloring component is hardly altered for a long term. Also, the coloring component 20 is hard to alter in a usual condition unless the coloring component is subjected to an abrupt temperature change, contact with nitrogen gas, or long-term irradiation of ultraviolet rays.

Returning to FIG. 1, in the dyeing step 300, the fine powdery natural material obtained in the pulverizing step 200 is mixed and dispersed into a liquid, e.g., water, and the textile is immersed in the liquid containing the fine powdery natural material in suspended condition for a predetermined time so that the fine powdery natural material suspended in the liquid is physically attached to the textile. The textile is thereby dyed in the color of the fine powdery natural material itself. The liquid to be mixed with the fine powdery natural material is suitably selected depending on the kind of the fine powdery natural material and the kind of the textile. For example, alkaline water, acidic water, etc. are selectively used depending on the pH of the fine powdery natural material. The textile to be dyed may be made of any type of natural and chemical fibers. Typical examples of the fibers include plant fibers such as cotton, animal fibers such as silk and wool, synthetic resins such as polyamide, and mixed fibers of one or more of them. Fiber products, i.e., textiles, may be in the form of threads, woven fabrics, knitted fabrics, nonwoven fabrics, cloths, sewed products, etc.

The physical action causing the fine powdery natural material to be attached to the textile is mainly based on ion adsorption. Therefore, the fine powdery natural material or the textile is made anionic or cationic in the dyeing step 300, if necessary, by the known method. Generally, the fine powdery natural material and the textile are each charged to be positive or negative in the liquid depending on the kind thereof. For example, when the fine powdery natural material and the textile are charged to be "positive and negative" or "negative and positive", respectively, the operation of making the fine powdery natural material or the textile anionic or cationic is not required, and the fine powdery natural material is adsorbed to the textile just by immersing the textile in the dye bath in which the fine powdery natural material is dispersed, whereby the textile is dyed.

On the other hand, when the fine powdery natural material and the textile are charged to be "positive and positive" or "negative and negative", respectively, the fine powdery natural material is adsorbed to the textile just by making one of the fine powdery natural material and the dye bath in which the fine powdery natural material is dispersed, or the textile anionic or cationic. As shown in FIG. 3, by way of example, the fine powdery natural material is covered with the coating layer. When the coating layer covering the fine powdery natural material used contains cellulose or resin, that fine powdery natural material becomes anionic in the water. That type of fine powdery natural material is not adsorbed to, e.g., a cotton textile or the like that generally has negative charges. Accordingly, for example, the dye bath is electrically treated by the known method such that charges of the fine powdery natural material have a polarity opposed to that of the textile. As a result, the fine powdery natural material is adsorbed to the textile immersed in the dye bath, and the textile is dyed.

Also, as described above, the natural material is pulverized in the pulverizing step 200 into the fine powder of not larger than the particle size being passable through 80 mesh in terms of sieve standards. The textile often includes microscopic gaps or holes. In the dyeing step 300, therefore, when the fine powdery natural material suspended in the liquid is attached to the gaps or holes in the textile and the textile surface, physical actions such as surface tension and frictional force also occur. Since those physical actions are additively developed together with adhesion forces generated by the above-described ion adsorption, the textile is dyed with higher fastness.

Particularly, when the coating layer covering the fine powdery natural material contains a fibrous substance, e.g., cellulose, the fibrous substance can be made projected out of the material surface, for example, by drying the natural material under depressurization (or under pressurization for sucking) in the drying step 100. In this case, since the projected fibrous substance serves as a hook to be caught by the textile, the fine powdery natural material can be attached to the textile with higher fastness.

According to the textile dyeing method of the present invention, as described above, the color of the natural material can be reproduced, as it is, on the textile by physically attaching the fine powdery natural material itself, as a dye, to the textile. Of course, the dyeing step 300 may be repeated plural times as required.

Further, in the dyeing step 300, instead of just attaching the fine powdery natural material dispersed in the liquid to the textile, the liquid including the fine powdery natural material mixed therein may be heated to, e.g., 40 to 80° C. during the dyeing. In this case, not only the fine powdery natural material is itself attached to the textile, but also the coloring component contained in the fine powdery natural material is extracted into the liquid, whereby the dyeing is additionally performed with the coloring component decocted by the heating. Of course, such a dyeing step under heating may be repeated plural times as in the above case. Although the use of a mordant is not particularly required in simple dyeing with the fine powdery natural material, a predetermined mordant may be used as required when it is desired to effectively dye the coloring component extracted from the fine powdery natural material to the textile.

After the completion of the dyeing step 300, a dyed textile obtained in the dyeing step 300 is left to stand as it is for a predetermined time. Finally, the dyed textile is washed by water and dried, whereby the dyeing step is finished. The fastness of color of the dyed textile is sufficiently high and additional mordanting or the like is not particularly required from the viewpoint of dyeing affinity. However, the additional mordanting or the like may also be of course performed as required.

Some of natural materials used as raw stuffs for dyes contain a large amount of sugar or oil and are hard to be dried and pulverized into fine powder. In the case of using such materials, the materials are subjected to a step of removing the sugar or the oil prior to the drying step 100.

In one example of the sugar removing step, after putting dried leaves of *Gymnema sylvestre* (*Asclepidaceae*) in water and boiling the water, the leaves of *Gymnema sylvestre* are removed and the water is cooled. By immersing the natural material containing a large amount of sugar in the water thus prepared, the sugar in the natural material can be removed. For example, the sugar removing step can be performed by putting 5 g of leaves of *Gymnema sylvestre* in 1000 cc of water and boiling the water for about 10 minutes, then removing the leaves of *Gymnema sylvestre* and cooling the remained water, and immersing stones and skins of grape, etc., which contain a large amount of sugar, in the cooled water for 5 to 7 hours.

On the other hand, in one example of the oil removing step, by immersing a material containing a large amount of oil in alkaline water, the oil can be removed from the material. In the case of using a natural material containing a large amount of oil, e.g., Yaku-sugi (Japanese cedar), the oil is removed from the natural material in advance by using strong alkaline water, for example. With that process, that type of natural material can be more effectively pulverized into fine power through the drying step 100 and the pulverizing step 200.

Further, the color of the dyed textile can be controlled by performing an additional step, described below, prior to the drying step 100 or during the dyeing step 300.

Generally, the hue of the natural material is not developed by a single coloring component. By removing a particular coloring component prior to the drying step 100, therefore, the hue of the natural material can be itself manipulated, whereby the hues of the dye and the dyed textile can also be controlled. For example, petals of a safflower contain yellow and red as main coloring components. However, when the safflower petals are put in water and decocted at an appropriate temperature, the red component is drifted into the hot water earlier than the yellow component. By adjusting the decocting time, it is possible to change balance between the yellow and red components contained in the safflower petals, and to obtain a dye (fine powdery natural material) developing bright yellow (or a yellowish hue).

Also, by previously adjusting the pH of a liquid (e.g., water) in which a dye is mixed in the dyeing step 300, the hue of the dye mixed in the liquid can be changed. Stated another way, even in the case of using the same dye obtained through the pulverizing step 200, the developed color of the dye can be adjusted by mixing the dye in liquids having different pH values. As one example, the inventor has confirmed that dyed textiles having quite different hues can be obtained by using the same dye produced from petals of a morning glory as raw stuffs and performing the dyeing step 300 in liquids having different pH values.

According to the textile dyeing method of the present invention, as described above, the textile can be dyed in the same color as that of the natural material with high fastness by physically attaching the pulverized natural material itself to the textile unlike the known method of dyeing the textile by the coloring component extracted from the natural material. Further, since the color is developed by the fine powdery natural material itself being attached as the dye to the textile, dyeing affinity is very high and a sufficient effect can be obtained with one cycle of the dyeing step. In addition, the dyed color has not only very strong fastness against laundering and bleaching, but also high resistance against discoloration.

Generally, in the known dyeing method using the extracted coloring component, the coloring component serving as a dye has the function being relatively weak in terms of a pigment, and therefore it cannot be used as a dye without being strengthened by a mordant or an aid. In contrast, according to the present invention, since the pulverized natural material is itself used as the dye instead of the extracted coloring component, it is not required to strengthen the coloring component by a mordant or an aid. Accordingly, a step of adding the mordant or the aid can be omitted and productivity can be increased. Also, since the mordant, the aid or the like which contains heavy metal, etc. and is harmful is not required, the dye bath (i.e., the liquid in which the fine powdery natural material is dispersed) after the completion of the dyeing step 300 is not harmful at all to the human body and the environment. Even when the dye bath is drained, special cleaning treatment is no longer required. This feature is also very advantageous from the viewpoints of productivity, work efficiency, and environmental protection.

The fine powdery natural material is obtained by drying and pulverizing the natural material in a manner not altering the coloring component, and has the coating layer as described above. Therefore, the coloring component in the fine powdery natural material is rarely contacted with open air and is hard to discolor and fade. It is hence possible to ensure sufficient fastness against discoloration and fading, and to obtain the dyed textile that is less susceptible to discoloration and fading. Further, the dye, i.e., the fine powdery natural material, has very high storage stability. For example, if the fine powdery natural material is sealed off in an enclosed container together with a desiccant, it can be stored for long years.

The fine powdery natural material can also be used in a state of being mixed in another dye without any problems. Since the fine powdery natural material is a solid dye, it does not exude unlike a water-base dye. Further, by mixing plural kinds of powdery natural materials having different colors with each other, the dyed color can be changed depending on a mixing ratio of the fine powdery natural materials. In addition, unlike conventional liquid dyes for dyeing textiles, the fine powdery natural materials having different colors are not fused into one and the individual colors developed by the fine powdery natural materials are not lost from microscopic point of view, thus enabling the dyed color to be expressed in deeper tone.

Moreover, according to the textile dyeing method of the present invention, since the fine powdery natural material obtained just by drying and pulverizing the natural material is used as the dye, any kinds of materials can be employed as raw stuffs for the dyes so long as the materials can be pulverized into fine powder of not larger than the predetermined particle size.

Raw stuffs usable for the dyes in the dyeing method according to the present invention are given by all kinds of natural materials including, plant materials such as trees, flowers, grains, vegetables, fruits, seaweeds, marine algae, edible wild plants, mushrooms, roots, stems and leaves, organisms and their shells, bones and excretions other than plants, such as eggs, shellfishes, corals, insects and larvae of the insects, other kinds of organic and inorganic materials such as stones, sands, earth, minerals, deposits of hot-spring water, foods, fibers and paper, byproducts and wastes generated when the above-mentioned materials are produced and processed as required, as well as the processed materials themselves. Stated another way, all of substances existing in the natural world and products produced as a result of using those substances can be used as the dyes in the textile dyeing method of the present invention so long as they can be pulverized into fine powder of the desired size and can be attached to the textile.

Those natural materials are intrinsically intended to be used in various fields including, e.g., foods, Chinese herbal medicines, wastes to be discarded, combustibles, and raw stuffs for any other products, but they can also be used as the dyes without being limited to their intrinsic uses. Practical examples of the natural materials are described below primarily regarding materials which were actually used as raw stuffs for the dyes to carry out dyeing by the inventor. As described above, however, all of substances existing in the natural world and products produced as a result of using those substances can be used as the dyes in the textile dyeing method of the present invention so long as they can be dried and pulverized into fine powder and can be attached to the textile, even if the substances are not included in the following practical examples.

Among the above-mentioned natural materials, examples which were actually pulverized and produced as the dyes by the inventor is as follows. Regarding trees, not only a Hinoki (Japanese cypress), cedars including Yaku-sugi (Japanese cedar), a maple, an Amur cork, a flowering dogwood, a tree of life, a camphor tree (including camphor), a royal poinciana, a ginkgo, a mulberry, a keyaki (zelkova tree), a cherry tree, and a nandin (sacred bamboo), but also perennial plants (e.g., a mugwort or a bad-smelling perennial plant of the family Saururaceae) were used as raw stuffs and a sufficient dyeing effect was confirmed. Those trees may be used in the form of material trees themselves, parts of the trees such as barks, stems, roots, leaves, flowers, fruits, seeds and spores, and materials separated from the trees. Also, the trees may be fresh or died. Further, the trees are not necessarily required to have original shapes, and may be in the cut, shaven, roasted or burnt form, or in the state of charcoal or ash after burning. In the case of coffee and tea, for example, not only trees and various parts thereof such as berries, roots, leaves and stems, but also "grounds" (e.g., coffee grounds and used tea leaves) left after the steps of roasting the berries and/or leaves, grinding the roasted berries and/or leaves, and extracting drinks can be used as raw stuffs for the dyes in the dyeing method according to the present invention. In other words, the trees used for the dyes in the dyeing method according to the present invention are not limited in parts, forms and states.

Regarding flowers, good results were obtained with, for example, a gentian, cherry blossoms, an ume (Japanese apricot) flower, an azalea, a hydrangea, a safflower, a geranium, a notch-leaf sea lavender (*Limonium*), a tulip, a kiku (chrysanthemum), a rose, a peony, a carnation, a cosmos, a poppy, a morning glory, a violet, a gold-handed lily, and an orchid (such as a lily of the valley, a butterfly, a Kaffir lily and a lady's slipper). Of course, similarly to the trees, the flowers can be used as raw stuffs for the dyes regardless of their parts, forms and states.

Regarding grains, good results were obtained with, for example, chaffs and ashes thereof, buckwheat chaffs, beans such as soybeans, rice, ancient rice, potatoes, taros, gromwells, yams (cinnamon vines), sweat potatoes, corns, and barleys. Of course, similarly to the trees, the grains can be used as raw stuffs for the dyes regardless of their parts, forms and states. Namely, the grains may be used in entirety or only in parts such as seeds or chaffs, and may be processed or cooked. It is needless to say that tofu (bean curd) produced from soybeans, tofu refuse obtained during the production process of tofu, etc. can also be used as raw stuffs.

Further, the sufficient dyeing effect was confirmed for vegetables such as an eggplant, a carrot, a red cabbage, a white rape, a tomato, parsley, an onion, a beefsteak plant, Guinea pepper, draw gourd shavings and a water melon; fruits/seeds including, in addition to coffee berries, not only various oranges such as a mandarin orange, a shaddock, a pompelmous (pomelo), a lemon, a kumguat and a citron, but also a jujube tree, a Cape jasmine, a strawberry, grapes, blueberry; mushrooms such as a shiitake mushroom, a matsutake mushroom, *agaricus,* an enokidake mushroom and a Jew's lear; edible wild plants such as a flowering fern and a bracken; and seaweeds such as wakame seaweed and a tangle. Of course, similarly to the trees, those materials can be used as raw stuffs for the dyes regardless of their parts, forms and states. Namely, those materials may be used in entirety or only in parts such as seeds or peels, and may be processed or cooked.

Regarding other plant materials, good results were confirmed for bulbs including, in addition to the above-mentioned potatoes and sweat potatoes, a narcissus, a lily, a tulip, an onion, a gladiolus, an iris, a dahlia, etc., and for leaves including the leaves of a mulberry, a keyaki (zelkova tree), a rose, a lotus, a taro, etc. Of those materials, a water repellent effect was confirmed for dyed textiles obtained by attaching dyes prepared using the leaves of a lotus and a taro as raw stuffs. Also, a specific bright-tone color can be expressed by using read or yellow leaves of a maple or a ginkgo, or dead leaves thereof. Further, good results were confirmed for foods such as powder milk; collectable or producible organisms and their dead bodies including insects, crabs, lobsters/shrimps, shellfishes, fishes, corals, etc.; bones, shells and egg shells (or eggs themselves and pats thereof) of organisms including cuttlefish bones, fish bones, shells of oysters and scallops, etc.; cores such as black lead fluorite ("black silica") and the so-called "iouseki"; glass and deposits of hot-spring water; and ceramics obtained by calcination of natural materials. In addition, fibers, fabrics, paper, oil, etc. produced from natural materials can also be used as raw stuffs for the dyes. Of course, similarly to the trees, those materials can be used as raw stuffs for the dyes regardless of their parts, forms and states.

Hitherto, there have been no coloring matters extracted from natural materials having colors in pure black and pure white, and it has been impossible to dye a textile in pure black and pure white by using the extracted coloring matters. However, the inventor has succeeded in dyeing a textile in pure black by using, as raw stuffs, a processed natural material. A practical example of such a processed natural material is lye contained in an eggplant, which is produced by heating the eggplant in an enclosed container in an oxygen-free state or by heating the eggplant while the temperature is adjusted to such an extent as causing no combustion reaction, thus carbonizing the eggplant. As an alternative, a true-black dye can also be obtained by a method of irradiating a high-frequency electromagnetic wave to heat an eggplant and remove moisture in a microwave oven, for example, pulverizing the dried eggplant into size of 140 microns, heating the pulverized eggplant, and cooling the eggplant powder in an oxygen-free state after it has turned to be black. Also, the inventor has succeeded in dyeing a textile in pure white by using an eggshell as a natural material. Hitherto, a chemically dyed white textile has generally had properties of a low light-blocking effect and relatively high transparency. The textile dyed using the eggshell has a very superior light-blocking effect and is less transparent because it is dyed by attaching the eggshell itself which has a high light-blocking effect.

By irradiating an infrared ray and drying the natural material at low temperatures with the above-described drying apparatus while activating cells of the natural material such that the coloring component will not be altered, the dried natural material can be obtained while the color of the natural material remains the same. Further, by employing, in the next pulverizing step, the pulverizer having a pair of stone- or ceramic-made mills, it is possible to minimize heat generated with the pulverization, pulverize the dried natural material within the temperature range in which the coloring component is not altered, and to obtain the fine powdery natural material while the color of the natural material remains the same. With those drying step and pulverizing step, the textile dyeing method of the present invention can be realized and the above-described noticeable advantages can be obtained.

By performing the drying step 100 and the pulverizing step 200 under the low-temperature environment in which the coloring component is hard to alter, another major merit is also obtained in point of producing the fine powdery natural material having the function specific to the natural material used, as it is, in addition to the function of the coloring component. For example, when peels, etc. of oranges are used as raw stuffs, a dyed textile having novel nature can be obtained which is highly antibacterial and has a slight refreshing favor of the oranges. Also, when parsley, Hinoki (Japanese cypress), Guinea pepper, etc. are used as raw stuffs, a dyed textile can be obtained which has sterilizing power and is highly superior in the hygienic point of view. Thus, by attaching, to the textile, the dye holding the function specific to the raw stuffs in a series of steps of the textile dyeing method according to the present invention, it is also possible to obtain the dyed textile having the function specific to the raw stuffs.

As understood from the fact that plants, etc. are often used as Chinese herbal medicines, some kinds of plants, etc. have specific effects beneficial for the human body when they are decocted and applied to the diseased part in the human body. Generally known examples of those plants, etc. include a Saint-John's-wort, an Amur cork, a Japanese silver leaf, a bad-smelling perennial plant of the family Saururaceae, a mugwort, etc. which are effective for incised wounds; an ashitaba (Angelica keiskei), an Amur cork, a Cape jasmine, a Japanese silverleaf, an elder, etc. which are effective for blows; a ground ivy, an Amur cork, a cherry tree, an iris, a Japanese honeysuckle, a leek, a loquat, a peach, a burnet, etc. which are effective for eczema; a Japanese Mallotus, an akebi, a plantain, a wood sorrel, a Cape jasmine, a cranesbill, a smilax, a daphne, a dayflower, a Japanese silverleaf, a bad-smelling perennial plant of the family Saururaceae, a wild rose, a creeping saxifrage, etc. which are effective for swellings (tumors); and a morning glory, etc. which are effective for chilblains. Although the above-cited materials are just by way of examples, dyed textiles (such as bandages and clothes) obtained by dying textiles according to the textile dyeing method of the present invention using those types of natural materials are expected to have effects of mitigating conditions of the diseased parts.

In particular, because the above-described drying apparatus can be used to obtain dried natural materials while keeping the colors of natural materials as they are, there is another merit that the drying apparatus can also be used as a novel one for producing dried flowers, for example.

Detailed examples of the above-mentioned textile dyeing method according to the present invention will be described below.

The inventor performed textile dyeing tests in accordance with the above-mentioned textile dyeing method by using parsley, barks of Hinoki (Japanese cypress), Guinea pepper (dried), and geranium flowers as raw stuffs.

The dyeing conditions in the tests and the test results of dyeing fastness according to JIS standards (the tests of dyeing fastness were commissioned to Japan Synthetic Textile Inspection Institute Foundation) are as follows.

<Case of Using Parsley as Raw Stuffs>

1. Dyeing Conditions
   a) Drying Step
   Raw stuffs: about 3% of the weight of a textile to be dyed, drying temperature: approximately 45° C., drying time: about 22-24 hours, and humidity: about 17-30 degrees.

b) Pulverizing Step

Pulverizer used: "Micropowder KGW-501" (by Nishi Ironworks Co., Ltd.), and particle size of the fine powdery natural material: particle size being passable through 100 mesh in terms of sieve standards.

c) Dyeing Step

Liquid used: water, liquid temperature: about 40-60° C., and immersion time: 1 hour.

2. Test Results

Fastness against light: classes 3-4.

Fastness against washing: discoloration and fading; class 4, and contamination; classes 4-5.

Fastness against sweat (acid): discoloration and fading; classes 4-5, and contamination; classes 4-5.

Fastness against sweat (alkali): discoloration and fading; classes 4-5, and contamination; classes 4-5.

Fastness against friction: dry; class 5, and wet; classes 4-5.

Fastness against water: discoloration and fading; classes 4-5, and contamination; classes 4-5.

<Case of Using Barks of Hinoki (Japanese cypress) as Raw Stuffs>

1. Dyeing Conditions a) Drying Step

Raw stuffs: about 3% of the weight of a textile to be dyed, drying temperature: approximately 60° C., drying time: about 10 hours, and humidity: about 17-30 degrees.

b) Pulverizing Step

Pulverizer used: "Micropowder KGW-501" (by Nishi Ironworks Co., Ltd.), and particle size of the fine powdery natural material: particle size being passable through 100 mesh in terms of sieve standards.

c) Dyeing Step

Liquid used: water, liquid temperature: about 40-60° C., and immersion time: 1 hour.

2. Test Results

Fastness against light: class 3.

Fastness against washing: discoloration and fading; class 4, and contamination; class 5.

Fastness against sweat (acid): discoloration and fading; classes 3-4, and contamination; classes 4-5.

Fastness against sweat (alkali): discoloration and fading; class 4, and contamination; classes 4-5.

Fastness against friction: dry; class 5, and wet; classes 4-5.

Fastness against water: discoloration and fading; class 4, and contamination; classes 4-5.

<Case of Using Guinea Pepper as Raw Stuffs>

1. Dyeing Conditions a) Drying Step

Raw stuffs: about 3% of the weight of a textile to be dyed, drying temperature: about 45-50° C., drying time: about 5 hours, and humidity: about 17-30 degrees.

b) Pulverizing Step

Pulverizer used: "Micropowder KGW-501" (by Nishi Ironworks Co., Ltd.), and particle size of the fine powdery natural material: particle size being passable through 100 mesh in terms of sieve standards.

c) Dyeing Step

Liquid used: water, liquid temperature: about 40-60° C., and immersion time: 1 hour.

2. Test Results

Fastness against light: class 4.

Fastness against washing: discoloration and fading; classes 4-5, and contamination; classes 4-5.

Fastness against sweat (acid): discoloration and fading; classes 4-5, and contamination; classes 4-5.

Fastness against sweat (alkali): discoloration and fading; classes 4-5, and contamination; classes 4-5.

Fastness against friction: dry; class 5, and wet; classes 3-4.

Fastness against water: discoloration and fading; classes 4-5, and contamination; classes 4-5.

<Case of Using Geranium Flowers as Raw Stuffs>

1. Dyeing Conditions a) Drying Step

Raw stuffs: about 3% of the weight of a textile to be dyed, drying temperature: about 38-45° C., drying time: about 20 hours, and humidity: about 17-30 degrees.

b) Pulverizing Step

Pulverizer used: "Micropowder KGW-501" (by Nishi Ironworks Co., Ltd.), and particle size of the fine powdery natural material: particle size being passable through 100 mesh in terms of sieve standards.

c) Dyeing Step

Liquid used: water, liquid temperature: about 40-60° C., and immersion time: 1 hour.

2. Test Results

Fastness against washing: discoloration and fading; class 4, and contamination; classes 4-5.

<Case of Using Coffee Grounds as Raw Stuffs>

1. Dyeing Conditions a) Drying Step

Raw stuffs: about 3% of the weight of a textile to be dyed, drying temperature: about 38-45° C., drying time: about 20 hours, and humidity: about 17-30 degrees.

b) Pulverizing Step

Pulverizer used: "Micropowder KGW-501" (by Nishi Ironworks Co., Ltd.), and particle size of the fine powdery natural material: particle size being passable through 200 mesh in terms of sieve standards.

c) Dyeing Step

Liquid used: water, liquid temperature: about 40-60° C., and immersion time: 1 hour.

2. Test Results

Fastness against washing: discoloration and fading; class 4, and contamination; classes 4-5.

As seen from the above results, the textiles dyed according to the textile dyeing method of the present invention showed excellent values in all the test items, including the highest rank, i.e., class 5, in many items. Further, for the cases of using parsley, barks of Hinoki (Japanese cypress), and Guinea pepper as raw stuffs, the antibacterial effect and the sterilizing power were tested based on comparison in the number of living germs between the original textile and the textile after repeating washing 10 times in accordance with JIS L0217 by using yellow staphylococci. As a result, measured bacteriostatic activation values and sterilization activation values sufficiently satisfied respective reference values.

INDUSTRIAL APPLICABILITY

According to the present invention, a textile can be dyed in the same color as that of a natural material with high fastness by attaching pulverized powder of the natural material itself to the textile unlike the known method of dyeing the textile by a coloring component extracted from the natural material.

The invention claimed is:

1. A textile dyeing method comprising:

a drying step of installing a core radiating nurturing light to resonate with cell molecules of animals and plants, hereinafter referred to as natural material, and to activate the cells in a drying chamber equipped with heating means for radiating a far infrared ray to raise temperature in said drying chamber and with ventilating means for adjusting the temperature and humidity in said drying chamber, and irradiating the far infrared ray from said heating means and the nurturing light from said core to the natural material in said drying chamber at a temperature adjusted by said heating means and said ventilating means to fall within a set temperature range in which a coloring component of the natural material is not altered, thereby drying the natural material into an absolutely dried state while activating the natural material;

a pulverizing step of grinding down the dried natural material obtained in said drying step under cooling, thereby pulverizing the natural material into fine powder of not larger than a particle size being passable through at least 80 mesh in terms of sieve standards while temperature is controlled not to exceed said set temperature range; and a dyeing step of mixing and dispersing the fine powdery natural material obtained in said pulverizing step into a liquid, immersing a textile in the liquid containing the fine powdery natural material in suspended condition, and electrically charging the textile and the fine powdery natural material into mutually different positive and negative states, thus causing the fine powdery natural material suspended in the liquid to be itself physically attached to the textile by ion adsorption while surface tension and frictional force are developed, as additive adhesion forces, between the textile and the fine powdery natural material, whereby the textile is dyed in the same color as that of the natural material.

2. The textile dyeing method according to claim 1, further comprising a step of decoding the natural material to remove a particular coloring component in the natural material prior to said drying step, thereby adjusting a hue of the fine powdery natural material.

3. The textile dyeing method according to claim 1, wherein pH of the liquid in which the fine powdery natural material is mixed and dispersed in said dyeing step is adjusted in advance.

4. The textile dyeing method according to claim 1, wherein when a coating layer covering the fine powdery natural material contains a fibrous substance, the fibrous substance is made projected out of the natural material by drying the natural material in said drying step while said drying chamber is held in a depressurized state, and the projected fibrous substance is caught by the textile in said dyeing step such that the fine powdery natural material is attached to the textile with higher fastness.

5. The textile dyeing method according to claim 1, further comprising, prior to said drying step, an oil removing step of removing oil from the natural material by immersing the natural material in an alkaline water.

6. The textile dyeing method according to claim 1, further comprising, prior to said drying step, a sugar removing step of removing sugar from the natural material by boiling water in which leaves of *Gymnema sylvestre* are put, removing the eaves of *Gymnema sylvestre*, cooling the remained water, and immersing the natural material in the cooled water.

7. A method for producing dye comprising:

a drying step of installing a core radiating nurturing light to resonate with cell molecules of animals and plants, hereinafter referred to as natural material, and to activate the cells in a drying chamber equipped with heating means for radiating a far infrared ray to raise temperature in said drying chamber and with ventilating means for adjusting the temperature and humidity in said drying chamber, and irradiating the far infrared ray from said heating means and the nurturing light from said core to the natural material in said drying chamber at a temperature adjusted by said heating means and said ventilating means to fall within a set temperature range in which a coloring component of the natural material is not altered, thereby drying the natural material into an absolutely dried state while activating the natural material; and a pulverizing step of grinding down the dried natural material obtained in said drying step under cooling, thereby pulverizing the natural material into fine powder of not larger than a particle size being passable through at east 80 mesh in terms of sieve standards while temperature is controlled not to exceed said set temperature range, and obtaining dyes.

* * * * *